United States Patent [19]

Swenson et al.

[11] Patent Number: 4,992,224
[45] Date of Patent: Feb. 12, 1991

[54] METHOD OF MAKING COMPOSITE FOAMED ARTICLES USING FLUID PRESSURE TO POSITION A SKIN LAYER

[75] Inventors: Harold W. Swenson, Dover, N.H.; Patricia A. Betzig, Gainsville, Fla.

[73] Assignee: Davidson Textron Inc., Dover, N.H.

[21] Appl. No.: 455,932

[22] Filed: Dec. 18, 1989

Related U.S. Application Data

[60] Continuation of Ser. No. 245,590, Sep. 19, 1988, abandoned, which is a division of Ser. No. 174,212, Mar. 28, 1988, Pat. No. 4,793,793.

[51] Int. Cl.$^5$ .............................................. B29C 67/22
[52] U.S. Cl. ................................. 264/46.6; 264/46.7; 264/46.8; 264/510
[58] Field of Search ................... 264/46.6, 46.7, 46.4, 264/46.8, 510, 511, 544

[56] References Cited

U.S. PATENT DOCUMENTS

| | | | |
|---|---|---|---|
| 3,933,562 | 1/1976 | Cruckshank | 264/544 |
| 4,115,170 | 9/1978 | Sanson | 264/46.6 |
| 4,336,009 | 6/1982 | Wolf | 425/116 |
| 4,406,848 | 9/1983 | Simpson | 264/161 |
| 4,420,447 | 12/1983 | Nakashima | 425/817 R |
| 4,501,541 | 2/1985 | Bethell et al. | 264/46.6 |
| 4,544,126 | 10/1985 | Melchert | 249/83 |
| 4,793,784 | 12/1988 | Belleville et al. | 425/127 |

FOREIGN PATENT DOCUMENTS

| | | | |
|---|---|---|---|
| 61-049828 | 3/1986 | Japan | 264/511 |
| 61-162308 | 7/1986 | Japan | 264/46.4 |
| 62-108039 | 5/1987 | Japan | 264/46.8 |
| 62-207608 | 9/1987 | Japan | 264/46.4 |

*Primary Examiner*—David A. Simmons
*Assistant Examiner*—Allan R. Kuhns
*Attorney, Agent, or Firm*—Reising, Ethington Barnard, Perry & Milton

[57] ABSTRACT

The apparatus includes a first female mold member defining a mold cavity for receiving a plastic skin or layer. A second mold member or slide is positioned with a surface thereon contiguous with the surface of the mold cavity. The surface of the second mold member receives and holds thereon a portion of the plastisol skin extending from the mold cavity. A third mold member, such as a mold core, positions a rigid insert in the mold cavity with an insert surface or edge adjacent the portion of the plastisol skin on the second mold member. The second mold member includes passages for directing fluid pressure against the portion of skin thereon to fold it over the adjacent insert edge. A fourth mold member, such as a mold lid, is movable toward the second and third mold members for pressing the folded-over skin against the insert during foam formation between the skin and insert.

3 Claims, 4 Drawing Sheets

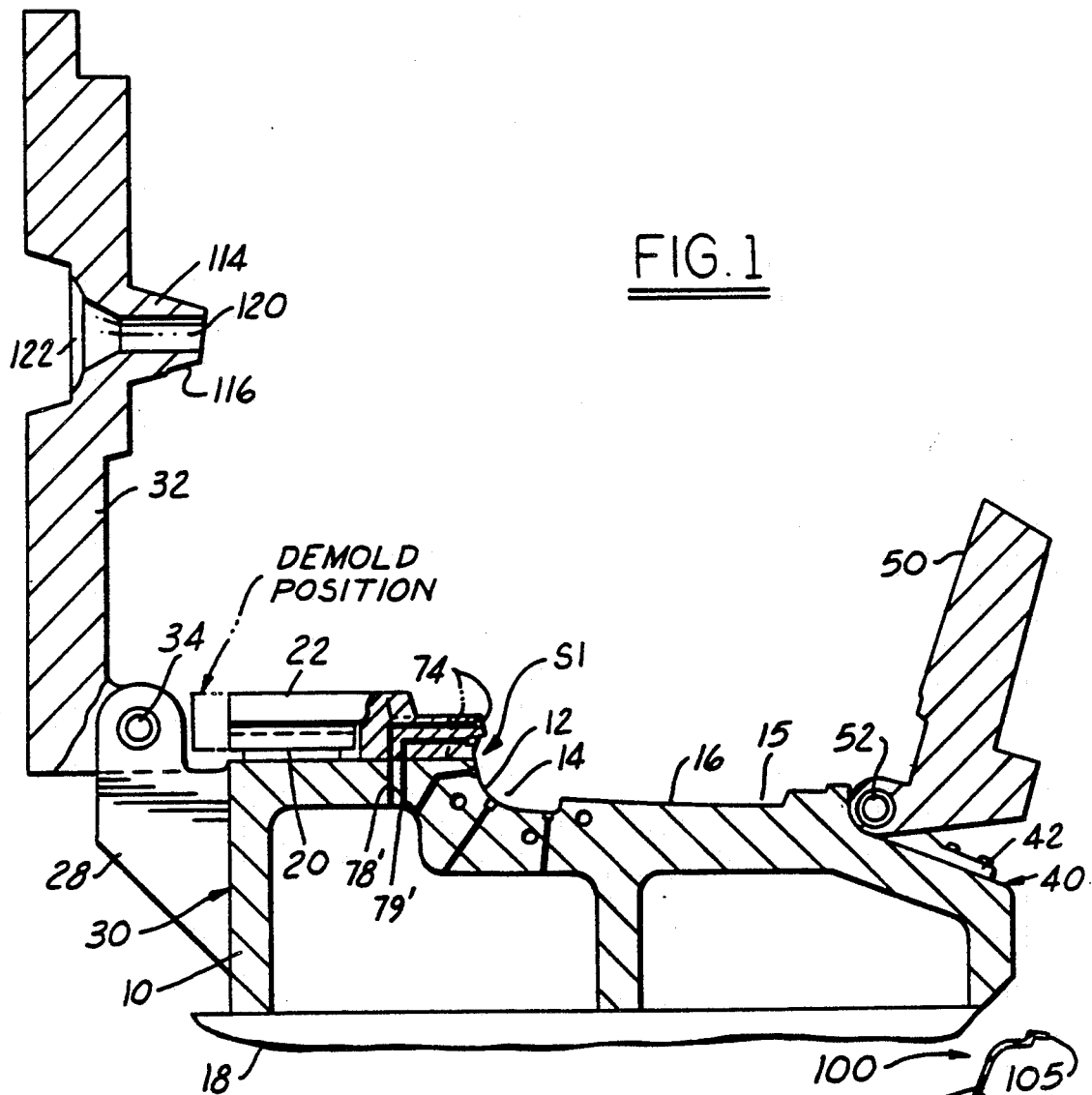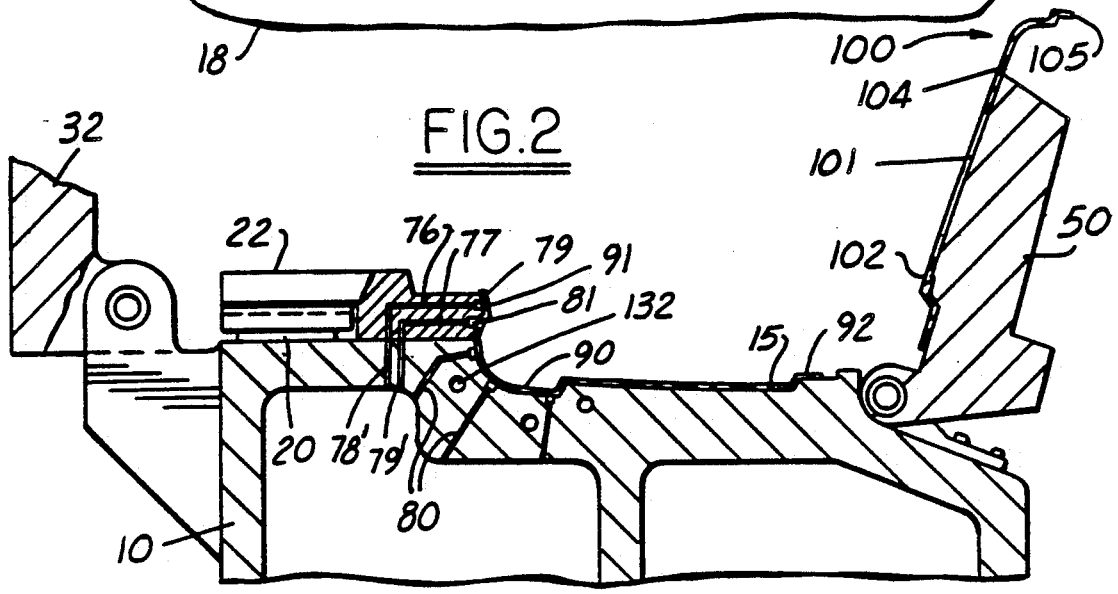

METHOD OF MAKING COMPOSITE FOAMED ARTICLES USING FLUID PRESSURE TO POSITION A SKIN LAYER

This is a continuation of copending application Ser. No. 07/245,590 filed on Sept. 19, 1988, now abandoned which is a division of application Ser. No. 174,212, filed on Mar. 28, 1988, now U.S. Pat. No. 4,793,793.

FIELD OF THE INVENTION

The invention relates to an apparatus and method for producing molded foam articles and, in particular, molded articles having an intermediate foam component between outer foam impermeable layers, especially where one of the outer layers is a decorative skin and the other is a rigid support insert and especially where the skin is wrapped over at least a portion of the insert.

BACKGROUND OF THE INVENTION

Molded foam articles having a foam layer such as polyurethane foam between an outer thin decorative plastisol skin and rigid plastic insert have been widely used in the field of interior automobile components such as crash pads, cushions, arm rests and the like.

In the prior art process for making such molded foam articles, a properly shaped mold cavity is lined with the thin plastisol skin, liquid polyurethane is poured onto the skin and the rigid insert is placed into position in the mold cavity spaced above the thin plastisol skin to leave a space therebetween for the liquid polyurethane to foam in situ therebetween when the mold is heated. Typically, the rigid insert is releasably carried on a mold lid which is moved into mating relation with the mold member defining the mold cavity. In the past, the plastisol skin is hand wrapped over the exposed edge of the rigid insert after it is inserted to close off the space therebetween to prevent foam egress. Hand wrapping of the plastisol skin over the exposed edge of the insert is time consuming and sometimes inconsistent such that foam escapes between the skin and insert edge resulting in a lower quality molded foam article.

The Nakashima U.S. Pat. No. 4,420,447 issued Dec. 13, 1983, discloses a process for making molded foam articles of the type described wherein the rigid insert is provided with a thin film on the side facing the thin plastisol skin in the mold cavity and wherein an edge or skirt portion of this film is pinched together with an edge or skirt portion of the plastisol skin between the mated mold members to reduce escape of foam and reduction in foam burr defects on the molded article.

The Melchert U.S. Pat. No. 4,544,126 issued Oct. 1, 1985, illustrates a dual lid foam molding apparatus for conducting a two-stage foam molding process to incorporate a frame member in the molded article. Each lid is alternately engaged on a female mold to carry out the two step foam molding process.

The Simpson U.S. Pat. 4,406,848 issued Sept. 27, 1983, discloses a mold assembly for making foamed articles wherein the assembly includes hingedly mounted wing members that cooperate with an insert in the closed position to form a mold cavity.

The Wolf U.S. Pat. No. 4,336,009 issued June 22, 1982, illustrates use of knife-edge type sealing surfaces on upper and lower mold members to indent and seal against an article to prevent rubber material from escaping from the mold cavity.

SUMMARY OF THE INVENTION

The invention contemplates an apparatus for making a molded foam article having an outer plastisol or other layer and including multiple mold members one of which is adapted to receive a portion of the layer extending from the mold cavity and to fold that portion over an adjacent insert surface by directing fluid pressure thereagainst.

The invention further contemplates an apparatus of the preceding paragraph wherein another of the mold members is adapted to press the folded-over portion of the layer against the insert during formation of foam between the skin and insert.

In a typical working embodiment of the invention, the apparatus includes a first mold member having a first surface defining a mold cavity for receiving the plastisol or other layer with a portion of the layer extending from the mold cavity. A second mold member is movable to a position where a second surface thereon is generally contiguous with the first surface for receiving thereon the portion of the layer extending from the mold cavity. A third mold member in the form of a mold core is movable toward the first mold member to position a support insert in the mold cavity with a surface or edge on the insert adjacent the portion of the layer on the second mold member. The second mold member includes one or more passages in the second surface for directing fluid pressure against the portion of the layer thereon to fold it over the adjacent insert edge. The passages are alternately connectable to a source of vacuum to hold the portion of the layer thereon while the insert is positioned in the mold cavity. Thereafter, fluid pressure is introduced to the passages to fold over the portion of the layer. The second surface thus includes means for creating differential pressure on opposite sides of the layer and reversing the differential pressure. A fourth mold member in the form of a mold lid is movable toward the second and third mold members and includes a surface cooperable with the second mold member to press the folded-over portion of the layer against the insert during foam injection between the skin and insert. Movements of the various mold members and provision of vacuum or fluid pressure can be automatically effected in proper sequence by a machine control unit. As is clear, this automatic sequence can include folding the portion of the layer over the insert and maintaining it there during foam formation.

In a preferred embodiment of the invention, the second and third mold members are spaced apart after the portion of the layer is folded to expose the folded-over portion and the fourth mold member includes a spout portion that extends into the space to press the exposed folded-over portion against the insert.

BRIEF DESCRIPTION OF THE DRAWINGS

FIG. 1 is a sectional view of the apparatus of the invention showing the multiple mold members in open positions.

FIG. 2 is similar to FIG. 1 but with a skin or layer received in the mold cavity and an insert releasably received on the mold core.

DESCRIPTION OF BEST MODE FOR PRACTICING THE INVENTION

Figure 3:
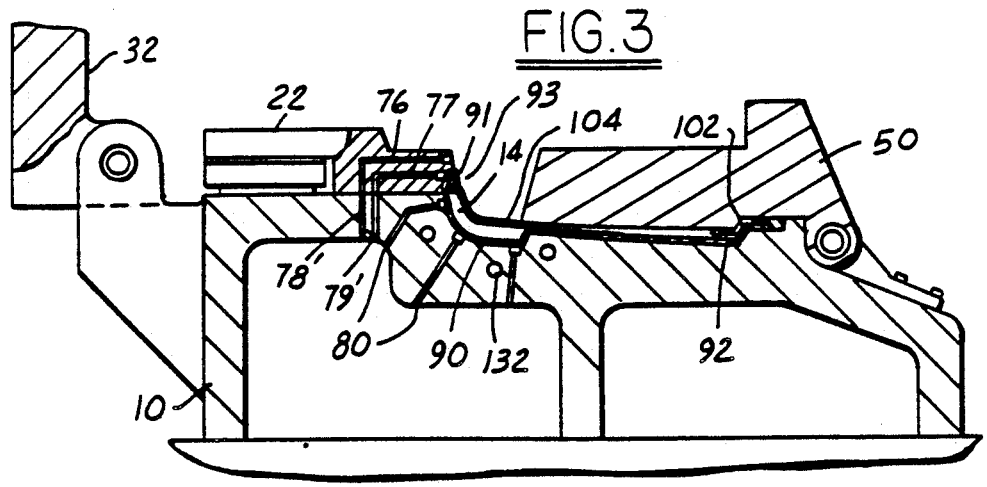
FIG. 3 is similar to FIG. 2 but with mold core pivoted to a closed position to position the insert in the mold cavity and with the portion of the skin folded over the adjacent insert edge.

Referring to FIGS. 1-6, the apparatus of the invention includes a first female mold member 10 having a first surface 12 defining a primary mold cavity 14 and a secondary cavity 15 interconnected by shallow intermediate cavity 16. Female mold member 10 is supported on a base 18.

Disposed slidably on a plurality of spaced apart slideways 20 on the top surface of the female mold member 10 along and adjacent a longitudinal side S1 of mold cavity 14 is a second mold member or slide 22. The second mold member 22 is slidably mounted on slideways 20 by a dovetail arrangement, see FIG. 6.

A plurality of brackets 28 are spaced apart along side 30 of the female mold member 10. A mold lid 32 in hingedly or pivotably mounted on the brackets by a hinge pin or shaft 34.

The opposite side 40 of the female mold member 10 includes a plurality of spaced apart brackets 42 in similar arrangement as brackets 28. A mold core 50 is hingedly or pivotally mounted on brackets 42 by a hinge pin or shaft 52.

The second mold member or slide 22 is slidably mounted on slideways 20 for movement between a closed operational position shown in solid in FIG. 1 and a demold position shown in phantom in FIG. 1.

Figure 6:
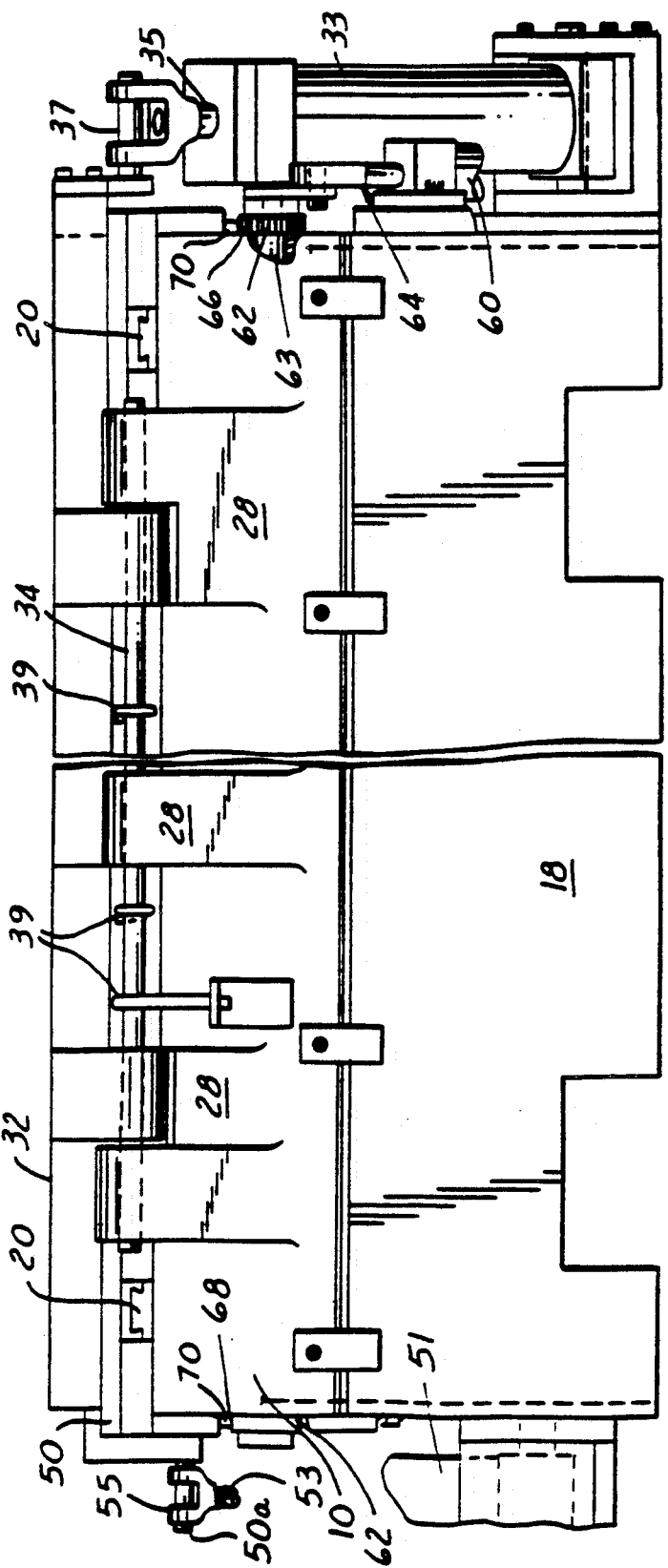
FIG. 6 is a side elevation of the apparatus.
Figure 7:
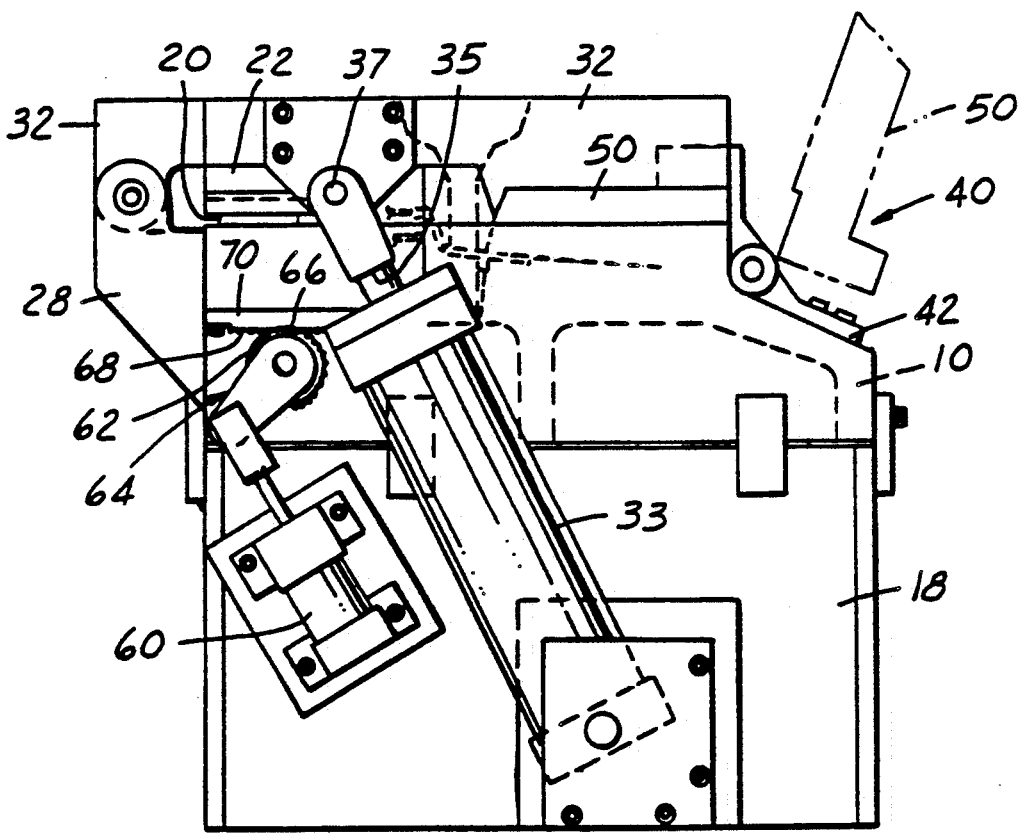
FIG. 7 is an end elevation of the apparatus.

The second mold member 22 is slid relative to slideways 20 by a fluid actuator 60 and drive spur gear 62 with a bell crank lever 64 therebetween, FIG. 7. The spur gear 62 includes peripheral teeth 66 that engage driven teeth 68 on a depending rack or plate 70 attached by machine screws or the like to the end of the second mold member. Spur gear 62 is journaled on a drive shaft 63 extending through the female mold member to the opposite side thereof where another spur gear 62 is journaled on shaft 63 to drive driven teeth 68 on an identical rack plate 70 attached to the second mold member on the opposite side, FIG. 6. Actuation of fluid actuator 60 effects rotation of spur gear 62 either clockwise or counterclockwise to move second mold member 20 between the operational and demold positions of FIG. 1.

The second mold member includes a second contoured surface 74 that is generally contiguous with first surface 12 when the second mold member is in the operational position (solid position) shown in FIG. 1. Second surface 74 is displaced to the left in FIG. 1 relative to first surface 12 when the second mold member is placed in the demold position. Second mold member includes passages 76,77 extending to grooves 79,81 the second surface 74 as shown. Grooves 79,81 extend along the length of surface 74.

In the operational position shown in FIG. 1, passages 76,77 in the second mold member are registered with passages 78',79' in the female mold member. The female mold member also includes passages 80 extending to surface 12 of the mold cavity. Passages 78'79' and 80 are connected by conduits 82 shown schematically in FIG. 4 to a common vacuum pump 84.

Figure 8:
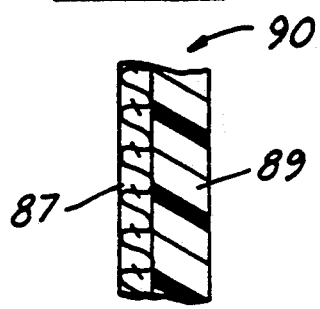
FIG. 8 is a sectional view through layer or skin 90 having a textile layer backed by a foam impermeable plastisol layer.

With the second mold member 22 and female mold member 10 in the position shown in FIG. 1, pre-cut layer or skin 90 comprising a textile layer 87 having a nonporous (foam impermeable) lamination or backing in the form of thermoplastic layer or skin 89, FIG. 8, is delivered to the mold cavity 14,15,16. The lamination or backing is typically plastisol such as vinyl. Layer or skin 90 has the genuine outline in plan of an automobile door panel.

The layer or skin 90 is thermal vacuum formed in mold cavity 14 by heating the layer by resistance electric heaters (not shown) positioned temporarily adjacent the layer while activating vacuum pump 84 to hold the layer against surface 12 by differential pressure on opposite sides of the layer.

A portion 91 of the layer 90 extends out of the mold cavity 14 as shown and is held on surface 74 of the second mold member 22 by differential pressure effects created by the relative vacuum in passages 76,77. Portion 91 is thermal vacuum formed with the remainder of layer 90 while portion 91 is so held on surface 74.

Typically, the layer 90 will be held adjacent surfaces 12,74 on a temporary frame while it is thermal vacuum formed in mold cavity 14 but the frame forms no part of the invention. The layer 90 is loaded on the frame and delivered to surfaces 12,74 on the frame which is removed from the layer and cavity after the thermal vacuum forming step.

Another portion 92 of layer 90 is received into secondary cavity 15 on the frame. Portion 92 is also thermal vacuum formed.

A rigid support insert 100 is releasably attached to a third mold member in the form of mold core 50. The insert 100 is rectangular in plan with the central portion 101 open or cut out to form longitudinal insert side 102 and opposite side 104. As shown in FIG. 2, insert side 104 is cantilevered from the mold core 50 for purposes to be explained. Insert side 104 includes an edge or surface 105. Suitable means known to those skilled in the art can be used to releasably mount the insert 100 on mold core 50.

After thermal vacuum forming of the layer 90 on surface 12 and while vacuum pump 84 is activated, the mold core 50 is pivoted from the open position of FIG. 1 to the closed position shown in FIG. 3 with insert edge 105 adjacent portion 91 of the layer 90. Fluid cylinder 51 is mounted on one end of the base 18 and includes plunger 53 connected by clevis 55 to shaft 50a extending from a depending flange on a side of the mold core 50. Actuation of cylinder 51 to extend plunger 53 raises mold core 50 to the open position shown in FIG. 1. Retraction of the plunger closes the mold core as shown in FIG. 3.

Figure 5:
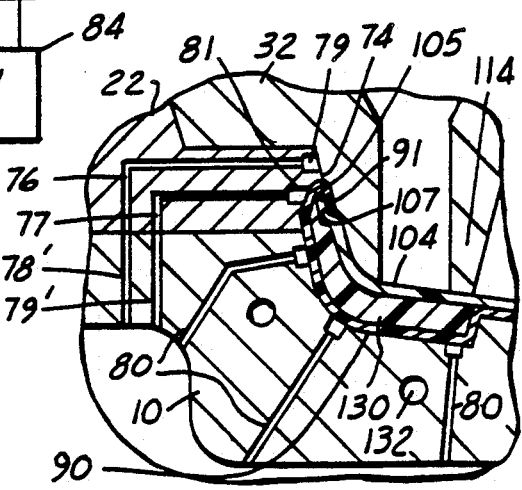
FIG. 5 is an enlargement of the encircled part of FIG. 4.

Once the insert 100 is thusly positioned in the mold cavity 14 with insert edge 105 adjacent the portion 91 of the layer on the second mold member, a valve 110 in conduits 82 leading from passages 78',79' is actuated to connect passages 76,77 to a source 112 of fluid pressure such as air pressure to direct air flow against portion 91 on surface 74 to blow the portion 91 in a folding manner over insert edge 105 as shown in FIGS. 3 and 5. Portion 91 is still flexible after thermal vacuum forming and can be blown or folded by the fluid air pressure over the insert edge.

It is clear from FIG. 3 that second mold member 22 and the mold core (third mold member) 50 are spaced apart with the folded-over portion 91 exposed in the space 93 therebetween.

Figure 4:
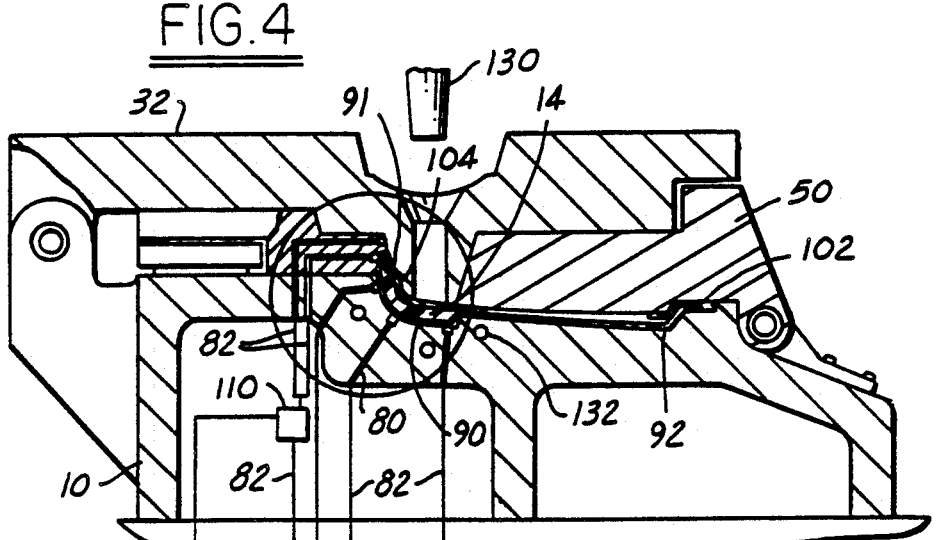
FIG. 4 is similar to FIG. 3 but with the mold lid pivoted to a closed position to press the folded over portion against the insert.

Once the portion 91 is folded-over insert edge 105, mold lid 32 is pivoted to the closed position shown in FIG. 4 wherein the mold lid 32 overlies mold members 22,50. Mold lid 32 includes tapered spout or sprue 114 that is received in space 93. Sprue 114 includes a surface 116 that mates with complementary surfaces on mold member 22,50 as shown and that presses folded-over portion 91 against insert edge 105 and adjacent insert surfaces 107 as shown in FIG. 5

Mold lid 32 includes passage 120 through sprue 114 extending to recess 122 in the top thereof. Insert 100 includes an opening (not shown) therein connecting passage 120 to the space between the layer 90 and insert 100 in the mold cavity. Liquid polyurethane is poured through passage 120 into the spaces between the skin and insert. Plug 130 is then inserted in passage 120 to seal off the opening in the insert in registry with passage 120. Then, the polyurethane is caused to foam and cure between the skin and insert by heating the mold cavity by conducting proper temperature fluid through passages 132 in the female mold member 10. FIG. 5 shows the polyurethane foam cured between the layer and insert in mold cavity 14. Polyurethane can flow in spaces between layer 90 and insert side 104 from mold cavity 14 to mold cavity 15 and is similarly cured between layer portion 92 and insert 102 in mold cavity 15. Channels (not shown) can be provided between layer 90 and insert side 104 and extending from mold cavity 14 to mold cavity 15 to aid such flow.

Mold lid 32 is pivoted about shaft 34 by means of fluid cylinder 33 mounted on the opposite side of the base 18 from fluid cylinder 51, FIG. 6. The plunger 35 of the cylinder is connected to shaft 37 extending from depending flange on the opposite side of the mold lid, FIG. 7. Coil springs 39 around shaft 34 provide a lid return action when plunger 35 is retracted. Means known to those skilled in the art and forming no part of the invention can be used to exert a clamping force on the mold lid 32 toward the base 18 during the foam injection and curing steps.

Curing of the polyurethane foam forms a composite molded article having an outer layer (90,91,92) and inner rigid insert 100 held together by the intermediate foam 130 cured therebetween with portion 91 held in position on insert edge 105 of insert side 104 by the cured foam.

The second mold member 22 and mold lid 32 maintain the portion 91 over and against insert edge 105 and other insert surfaces to prevent or minimize escape of polyurethane foam therebetween that could form foam burrs requiring subsequent removal. A higher quality product is provided with substantial elimination of post molding operations to trim off foam burrs.

In the secondary cavity 15, the portion 92 is bonded to the insert 100 by cured foam in the space between portion 92 and the insert.

The molded article is removed from the apparatus by pivoting the mold lid 32 to the open position shown in FIG. 1 after releasing the insert so that it remains in the mold cavity, then pivoting mold core 50 to the open position shown in FIG. 1 and then sliding the second mold member 22 to its demold position also shown in FIG. 1. After the molded article is removed, second mold member 22 is returned to its operational position to repeat the sequence of steps described hereinabove for forming another molded article.

As mentioned hereinabove, the sequential motions of the mold members to insert the layer 90 and insert 100 and to move the mold members to fold the portion 91 over the insert and hold it there during foam injection and curing can be effected and controlled automatically by a machine control unit so that minimal manual effort, if any, is required to form the molded article.

While the invention has been described by a detailed description of certain specific and preferred embodiments, it is understood that various modifications can be made in them within the scope of the appended claims which include equivalents of such embodiments.

I claim:

1. A method for making a molded foam article comprising:
   (a) positioning a layer in a mold cavity of a first mold member with a portion of the layer extending from the mold cavity on a second mold member,
   (b) positioning an insert in the mold cavity to form a molding space between the insert and the layer in the mold cavity with a surface on the insert adjacent said portion of the layer,
   (c) applying fluid pressure against said portion of the layer on the second mold member to blow said portion off said second mold member for free movement in a direction away therefrom toward the adjacent insert surface to fold said portion over the adjacent insert surface,
   (d) moving a mold lid in a direction to press the folded-over portion of the layer against the insert, and
   (e) forming foam in the molding space between the layer and insert while said portion is folded over and pressed against the insert surface.

2. The method of claim 1 wherein said mold lid presses the folded-over portion of the layer against an edge of the insert, said edge facing away from said molding space.

3. The method of claim 2 wherein said mold lid presses said folded-over portion against an insert surface adjacent said edge and facing away from the molding space.

* * * * *

UNITED STATES PATENT AND TRADEMARK OFFICE
CERTIFICATE OF CORRECTION

PATENT NO. : 4,992,224
DATED : February 12, 1991
INVENTOR(S) : Harold W. Swensen, et. al.

It is certified that error appears in the above-indentified patent and that said Letters Patent is hereby corrected as shown below:

On the Title page, item [57], Abstract, line 2, delete "plastic" and insert-- plastisol-- therefor.

Column 3, line 27, delete "in" and insert --is-- therefor;
Column 3, line 53, delete "20" and insert --22-- therefor;
Column 3, line 64, after "grooves 79,81" insert --in--.

Signed and Sealed this

Seventeenth Day of August, 1993

Attest:

BRUCE LEHMAN

*Attesting Officer*  *Commissioner of Patents and Trademarks*